US010438527B2

(12) United States Patent
Lee et al.

(10) Patent No.: US 10,438,527 B2
(45) **Date of Patent: *Oct. 8, 2019**

(54) DISPLAY DEVICE AND METHOD OF DRIVING THE DISPLAY DEVICE

(71) Applicant: SAMSUNG DISPLAY CO., LTD., Yongin-si, Gyeonggi-do (KR)

(72) Inventors: Da-Jeong Lee, Yongin-si (KR); Young-Nam Yun, Yongin-si (KR)

(73) Assignee: Samsung Display Co., Ltd., Yongin, Gyunggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/036,021

(22) Filed: Jul. 16, 2018

(65) Prior Publication Data

US 2018/0322821 A1 Nov. 8, 2018

Related U.S. Application Data

(63) Continuation of application No. 15/348,713, filed on Nov. 10, 2016, now Pat. No. 10,026,349, which is a (Continued)

(30) Foreign Application Priority Data

Oct. 5, 2012 (KR) ........................ 10-2012-0110693

(51) Int. Cl.
*G06F 1/00* (2006.01)
*G09G 3/20* (2006.01)

(52) U.S. Cl.
CPC ......... *G09G 3/2003* (2013.01); *G09G 3/2092* (2013.01); *G09G 2300/0413* (2013.01);

(Continued)

(58) Field of Classification Search
CPC ... G06F 1/00; G09G 3/20; G09G 5/10; G09G 5/02; G09G 5/00; G09G 9/33
See application file for complete search history.

(56) References Cited

U.S. PATENT DOCUMENTS 7,319,471 B2 1/2008 Natori et al.
7,573,493 B2 8/2009 Brown Elliott et al.
(Continued)

FOREIGN PATENT DOCUMENTS

CN 1 539 129 A 10/2004
CN 101083047 A 12/2007
(Continued)

OTHER PUBLICATIONS

Search Report from related Taiwan Patent Application No. 102108553, dated Oct. 28, 2016.
(Continued)

*Primary Examiner* — Michael A Faragalla
(74) *Attorney, Agent, or Firm* — Lee & Morse, P.C.

(57) ABSTRACT

A display device includes a display panel including a plurality of pixels arranged in a pentile pattern, the plurality of pixels having at least a first pixel and a second pixel adjacent to the first pixel, and the display panel being configured to display colors corresponding to respective output color data of the first and second pixels, and a color data converter configured to convert input color data to generate the output color data, the color data converter including a determiner configured to receive the input color data, to determine whether the first pixel displays a white color and the second pixel displays a black color, and to generate a first determination signal based on a result of the determination, and an adjustment unit configured to adjust the output color data of the first or second pixel based on the first determination signal.

20 Claims, 5 Drawing Sheets

Related U.S. Application Data continuation of application No. 13/765,779, filed on Feb. 13, 2013, now Pat. No. 9,613,557.

(52) U.S. Cl.
CPC ............... *G09G 2300/0452* (2013.01); *G09G 2320/0666* (2013.01); *G09G 2340/06* (2013.01)

(56) References Cited

U.S. PATENT DOCUMENTS

| | | | | |
|---|---|---|---|---|
| 7,583,279 | B2 | 9/2009 | Brown Elliott et al. | |
| 8,018,476 | B2 | 9/2011 | Credelle et al. | |
| 8,134,583 | B2 | 3/2012 | Credelle | |
| 2003/0103058 | A1* | 6/2003 | Hellen Brown Elliott .................. | G09G 3/20 345/589 |
| 2007/0279354 | A1 | 12/2007 | Yim | |
| 2008/0043045 | A1* | 2/2008 | Natori ....................... | G09F 9/33 345/690 |
| 2009/0303228 | A1 | 12/2009 | Maeda et al. | |
| 2009/0303420 | A1* | 12/2009 | Kim ...................... | G02F 1/1323 349/96 |
| 2010/0026705 | A1 | 2/2010 | Im et al. | |
| 2013/0063050 | A1 | 3/2013 | Morikawa et al. | |
| 2013/0088505 | A1* | 4/2013 | Jain ....................... | G06T 11/203 345/589 |

FOREIGN PATENT DOCUMENTS

| | | |
|---|---|---|
| JP | 2010060907 A | 3/2010 |
| KR | 10-2004-0067851 | 7/2004 |
| KR | 10-2007-0018049 | 2/2007 |
| KR | 10 2012-0059039 A | 6/2012 |

OTHER PUBLICATIONS

Chinese Office Action Application No. 201310016727.4, issued by the Chinese Patent Office dated Dec. 29, 2016.
Korean Notice of Allowance dated Feb. 7, 2019.
Korean Registration Determination dated Jun. 20, 2019.

* cited by examiner

DISPLAY DEVICE AND METHOD OF DRIVING THE DISPLAY DEVICE

CROSS-REFERENCE TO RELATED APPLICATIONS

This is a continuation application based on application Ser. No. 15/348,713, filed Nov. 10, 2016, which in turn is a continuation of application Ser. No. 13/765,779, filed Feb. 13, 2013, now U.S. Pat. No. 9,613,557 B2, issued Apr. 4, 2017, the entire contents of which is hereby incorporated by reference.

This application claims the benefit of Korean Patent Application No. 10-2012-0110693, filed on Oct. 5, 2012, in the Korean Intellectual Property Office, the disclosure of which is incorporated herein in its entirety by reference.

BACKGROUND

1. Field

Example embodiments relate to display devices, and more particularly, to a display device including pixels arranged in a Pentile pattern.

2. Description of the Related Art

In a display panel of a display device, red, green, and blue sub-pixels are arranged in various ways. For example, red, green, and blue sub-pixels may be arranged in a checkerboard pattern including two green sub-pixels, one red sub-pixel, and one blue sub-pixel, or in a striped pattern including one green sub-pixel, one red sub-pixel, and one blue sub-pixel. In another example, red, green, and blue sub-pixels may be arranged in a Pentile pattern.

SUMMARY

Example embodiments provide a display device with an array of pixels arranged in a Pentile pattern, where a green tint phenomenon is prevented or substantially minimized, thereby enhancing the quality of an image.

According to an aspect of the example embodiments, there is provided a display device including a display panel including a plurality of pixels arranged in a pentile pattern, the plurality of pixels having at least a first pixel and a second pixel adjacent to the first pixel, and the display panel being configured to display colors corresponding to respective output color data of the first and second pixels, and a color data converter configured to convert input color data to generate the output color data, the color data converter including a determiner configured to receive the input color data, to determine whether the first pixel displays a white color and the second pixel displays a black color, and to generate a first determination signal based on a result of the determination, and an adjustment unit configured to adjust the output color data of the first or second pixel based on the first determination signal.

The adjustment unit may decrease a value of output color data of a green sub-pixel included in the first pixel.

The adjustment unit may increase a value of output color data of a green sub-pixel included in a third pixel adjacent to the first pixel.

The adjustment unit may increase a value of output color data of a red or blue sub-pixel included in the first pixel.

The display device may further comprise a dummy sub-pixel column comprising a red sub-pixel and a blue sub-pixel alternately arranged on a corner of at least one of right and left sides of the display panel.

The determiner may determine whether a pixel adjacent to the dummy sub-pixel column displays a whiter color, and generate a second determination signal based on a result of the determination. The adjustment unit may adjust output color data of each sub-pixel included in the dummy sub-pixel column, based on the second determination signal.

The adjustment unit may increase a value of output color data of the dummy sub-pixel column.

The display panel may comprise a plurality of pixels. The pixels may comprise a first sub-pixel column in which a first sub-pixel for displaying a first color alternates with a second sub-pixel for displaying a second color in a first direction, a second sub-pixel column in which a first sub-pixel alternates with a second sub-pixel in an opposite order to the alternating order of the first sub-pixel column in the first direction, and a third sub-pixel column in which third sub-pixels for displaying a third color are arranged in the first direction.

According to another aspect of the example embodiments, there is provided a display device comprising: a display panel which comprises a plurality of pixels arranged in a Pentile pattern, the pixels comprising a first pixel and a second pixel adjacent to the first pixel, and which displays colors corresponding to respective pieces of output color data of the first and second pixels, a data driver which supplies output color data to each of the pixels, a gate driver which supplies a gate on voltage to each of the pixels, and a timing controller which controls the data driver and the gate driver to be driven. The timing controller comprises a determiner which receives the input color data, determines whether the first pixel displays a white color and the second pixel adjacent to the first pixel displays a black color, and generates a first determination signal based on a result of the determination, and an adjustment unit which adjusts the output color data of the first or second pixel based on the first determination signal.

The adjustment unit may decrease a value of output color data of a green sub-pixel included in the first pixel.

The adjustment unit may increase a value of output color data of a green sub-pixel included in a third pixel adjacent to the first pixel.

The adjustment unit may increase a value of output color data of a red or blue sub-pixel included in the first pixel.

The display device may further comprise a dummy sub-pixel column comprising a red sub-pixel and a blue sub-pixel alternately arranged on a corner of at least one of right and left sides of the display panel.

The determiner may determine whether a pixel adjacent to the dummy sub-pixel column displays a whiter color, and generate a second determination signal based on a result of the determination. The adjustment unit may adjust output color data of each sub-pixel included in the dummy sub-pixel column, based on the second determination signal.

The adjustment unit may increase a value of output color data of the dummy sub-pixel column.

The display panel may include a plurality of pixels, and the pixels may comprise a first sub-pixel column in which a first sub-pixel for displaying a first color alternates with a second sub-pixel for displaying a second color in a first direction, a second sub-pixel column in which a first sub-pixel alternates with a second sub-pixel in an opposite order to the alternating order of the first sub-pixel column in the first direction, and a third sub-pixel column in which third sub-pixels for displaying a third color are arranged in the first direction.

According to another aspect of the example embodiments, there is provided a method of driving a display device, the display device including a display panel which comprises a plurality of pixels arranged in a Pentile pattern, the pixels including a first pixel and a second pixel adjacent to the first pixel, and which displays colors corresponding to respective pieces of output color data of the first and second pixels. In the method, a determiner receives the input color data, determines whether the first pixel displays a white color and the second pixel adjacent to the first pixel displays a black color, and generates a first determination signal based on a result of the determination, and an adjustment unit adjusts the output color data of the first or second pixel based on the first determination signal.

The adjustment unit may decrease a value of output color data of a green sub-pixel included in the first pixel.

The adjustment unit may increase a value of output color data of a green sub-pixel included in a third pixel adjacent to the first pixel.

The adjustment unit may increase a value of output color data of a red or blue sub-pixel included in the first pixel.

BRIEF DESCRIPTION OF THE DRAWINGS

The above and other features and advantages will become more apparent by describing in detail exemplary embodiments with reference to the attached drawings, in which.

DETAILED DESCRIPTION

Figure 1:
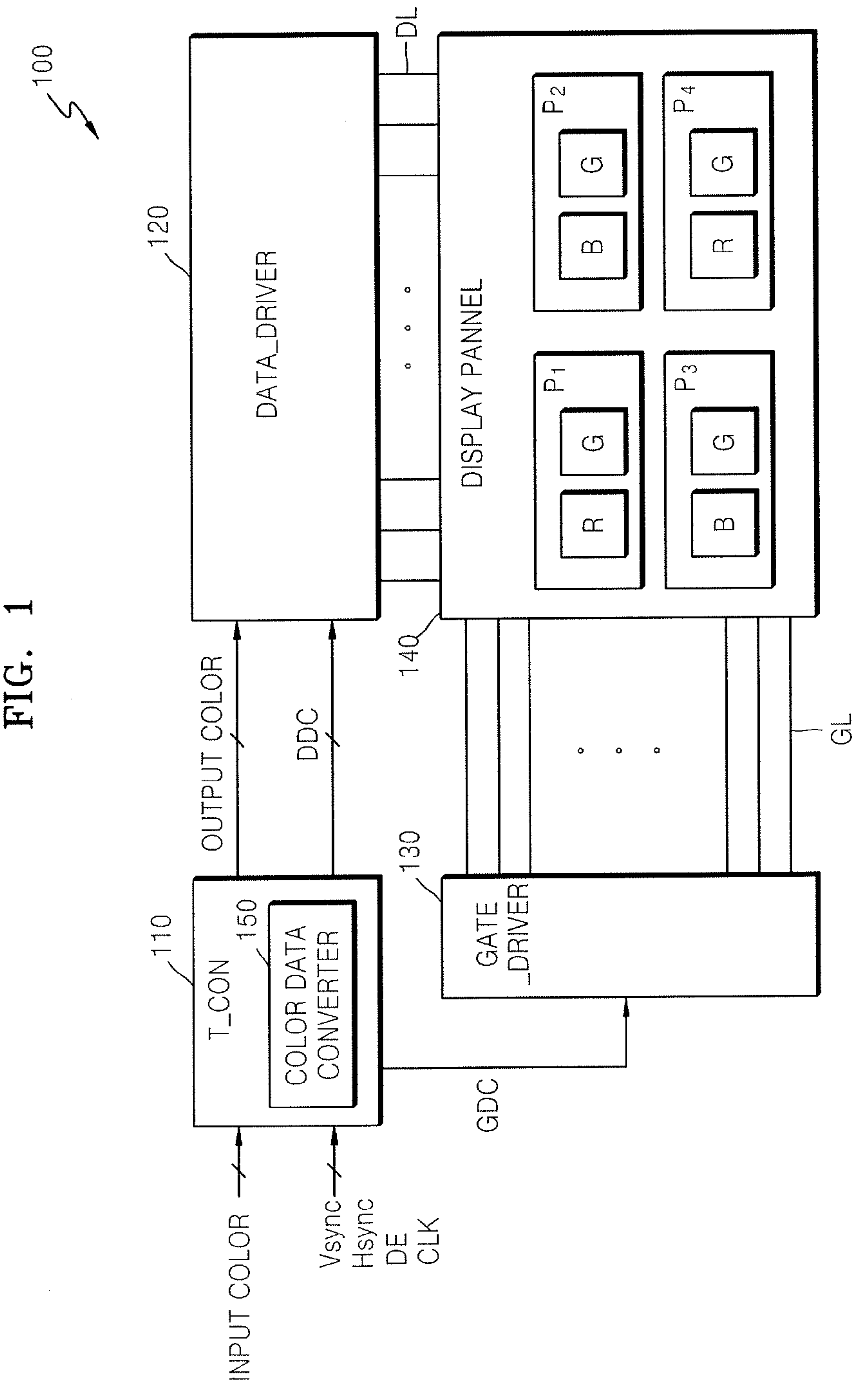
FIG. 1 is a block diagram of a display device according to an embodiment.

Hereinafter, exemplary embodiments will be described more fully with reference to the accompanying drawings. These embodiments are provided so that this disclosure will be thorough and complete, and will fully convey the inventive concept to those skilled in the art. As the exemplary embodiments allow for various changes and numerous embodiments, particular embodiments will be illustrated in the drawings and described in detail in the written description. However, this is not intended to limit the example embodiments to particular modes of practice, and it is to be appreciated that all changes, equivalents, and substitutes that do not depart from the inventive spirit and technical scope are included therein. Like reference numerals refer to like elements throughout. In the drawings, sizes of structures may be exaggerated for clarity. Expressions such as "at least one of," when preceding a list of elements, modify the entire list of elements and do not modify the individual elements of the list.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, components, or combinations thereof, but do not preclude the presence or addition of one or more other features, integers, steps, operations, elements, components, or combinations thereof.

It will be understood that, although the terms 'first', 'second', 'third', etc., may be used herein to describe various elements, these elements should not be limited by these terms. These terms are only used to distinguish one element from another element. For example, a first element discussed below may be termed a second element, and similarly, a second element may be termed a first element without departing from the teachings of this disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a display device 100 according to an embodiment. Referring to FIG. 1, the display device 100 may include a display panel 140, a timing controller 110, a data driver 120, and a gate driver 130.

In the display panel 140, a plurality of data lines DL intersects a plurality of gate lines GL. A plurality of pixels, e.g., pixels P1, P2, P3, and P4, each including two sub-pixels, are arranged on a display region at intersection regions of the data lines DL and the gate lines GL. For example, the pixel P1 may include an R sub-pixel for emitting red light, and a G sub-pixel for emitting green light. The pixel P2 adjacent to the pixel P1 on the right side of the pixel P1 may include a G sub-pixel for emitting green light and a B sub-pixel for emitting blue light. The pixel P3 positioned below and adjacent to the pixel P1 may include a B sub-pixel and a G sub-pixel. The pixel P4 positioned on the right side of the pixel P3 and adjacent to the pixel P3 may include a G sub-pixel and a R sub-pixel. In other words, the pixels P1, P2, P3, and P4 of the display panel 140 may be arranged in a Pentile pattern. Although each of the pixels P1, P2, P3, and P4 includes two sub-pixels in FIG. 1, the pixels P1 and P2 may be described as a single pixel with four sub-pixels, and the pixels P3 and P4 may be described as a single pixel with four sub-pixels.

Although the display panel 140 includes a pixel R for displaying a red color, a pixel B for displaying a blue color, and a pixel G for displaying a green color in FIG. 1, the display panel 140 may further include a pixel for displaying a color other than red, green, and blue colors, or may include a plurality of pixels for displaying a plurality of different colors other than red, green, and blue colors. Further, although four pixels are illustrated in FIG. 1, this is only for convenience of explanation, and the number of pixels included in the display panel 140 may vary according to an application to be applied.

The data driver 120 converts output color data OUTPUT COLOR having a compensated color coordinate into an analog data signal and provides the analog data signal to the data lines DL, under the control of the timing controller 110.

The gate driver 130 selects a horizontal line to which a data voltage is to be applied, by generating scan pulses and sequentially supplying the scan pulses to the gate lines GL, under the control of the timing controller 110.

The timing controller 110 generates a data control signal DDC for controlling operation timing of the data driver 120 and a gate control signal GDC for controlling operation timing of the gate driver 130, based on timing signals such as a vertical synchronization signal Vsync, a horizontal synchronization signal Hsync, a clock signal CLK, and a data enable signal DE.

The timing controller 110 may include a color data converter 150. The color data converter 150 may receive input color data INPUT COLOR from an external source and may supply the output color data OUTPUT COLOR having a compensated color coordinate to the data driver 120. The color data converter 150 may be implemented in the data driver 120 or in a separate chip, and may be changed according to an application which is to be applied.

In general, rendering refers to a process for providing a sense of reality in consideration of surrounding information such as a light source, a location, or a color. That is, rendering enhances a three-dimensional effect and a sense of reality by, e.g., providing shadow to an image or changing a density tone of a two-dimensionally viewed subject. In other words, rendering is an image processing method for displaying two-dimensional or three-dimensional graphic images. To render image data of a flat panel display device, the color data converter 150 may convert a color coordinate.

Figure 2:
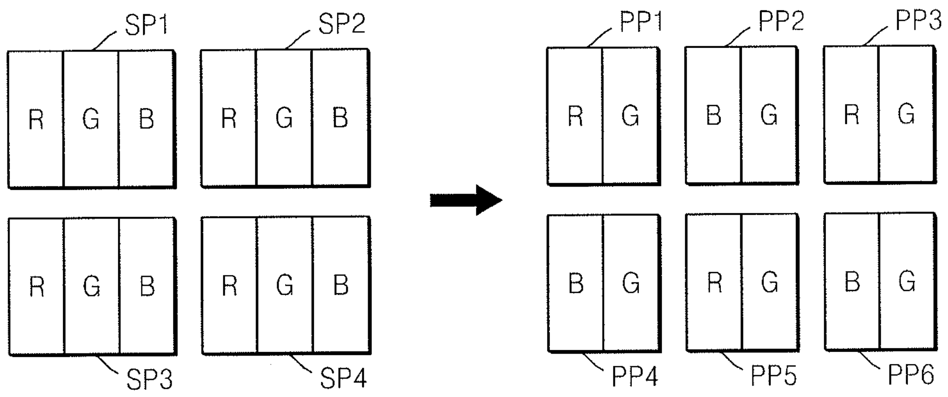
FIG. 2 illustrates a method in which a color data converter included in the display device of FIG. 1 converts a color coordinate according to rendering.

FIG. 2 illustrates a method in which the color data converter 150 converts a color coordinate according to rendering.

Referring to FIG. 2, the input color data of the color data converter 150 may be data matched with a stripe arrangement. For convenience of explanation, it is assumed that the input color data includes red color data, green color data, and blue color data. It is also assumed that an image produced by pixels SP1, SP2, SP3, and SP4, for which input color data is arranged in a stripe pattern, is consistent with an image produced by pixels PP1, PP2, PP3, PP4, PP5, and PP6, for which output color data is arranged in a Pentile pattern.

In detail, input color data for the pixel SP1 may include blue color data. Since the pixel PP1 includes no blue sub-pixels, output color data for the pixel PP1 may not include blue color data. Accordingly, the color data converter 150 produces output color data by converting, e.g., generating, a color coordinate for pixel PP2 adjacent to the pixel PP1 in order to produce the blue color data of the pixel SP1.

Similarly, input color data for the pixel SP2 may include red color data. Since the pixel PP2 includes no red sub-pixels, output color data for the pixel PP2 may not include red color data. Accordingly, the color data converter 150 produces output color data by converting a color coordinate so that the pixel PP3 adjacent to the pixel PP2 produces the red color data for the pixel SP2.

In other words, the pixel PP2 may produce blue color data corresponding to the pixel PP1, and the pixel PP3 may produce red color data corresponding to the pixel PP2. This is referred to as rendering. Although this rendering may enhance a 3D effect and a sense of reality, when a pixel adjacent to a pixel that displays a white color displays a black color, a green tint may be generated. This is referred to as a green tint phenomenon or a greenish phenomenon.

Therefore, the color data converter 150, according to example embodiments, also analyzes input color data. When the color data converter 150 determines that a pixel adjacent to a pixel displaying a white color displays a black color, the color data converter 150 decreases the value of green color data of the pixel displaying a white color or increases the values of red color data and blue color data of the pixel displaying a white color. Thus, a green tint phenomenon may be prevented.

Figure 3:
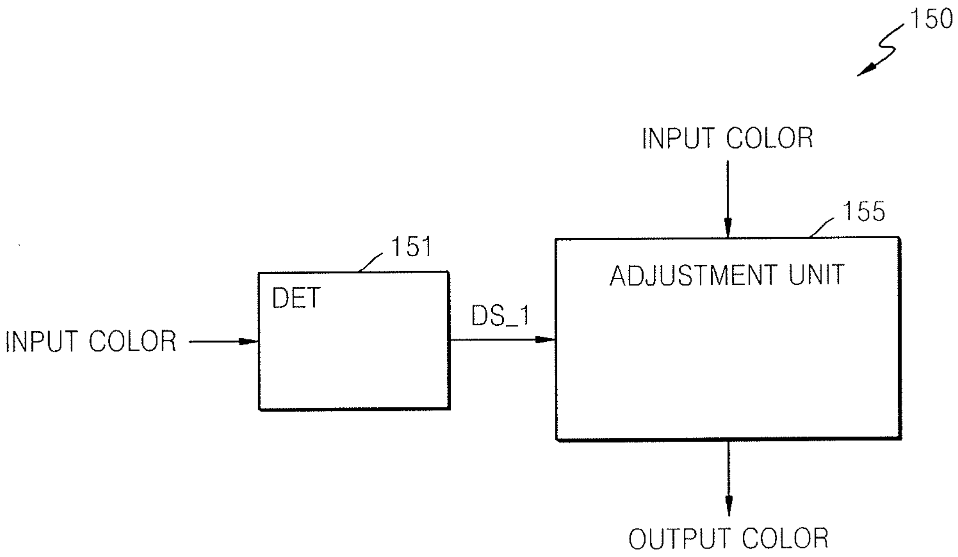
FIG. 3 is a block diagram of the color data converter included in the display device of FIG. 1.

FIG. 3 is a block diagram of the color data converter 150. Referring to FIG. 3, the color data converter 150 includes a determiner (DET) 151 and an adjustment unit 155.

The DET 151 receives the input color data INPUT COLOR and generates a first determination signal DS_1. The DET 151 determines whether a pixel adjacent to a pixel that displays a white color displays a black color, by analyzing the input color data INPUT COLOR. The DET 151 generates the first determination signal DS_1, based on a result of the determination.

For example, when the pixel SP1 of FIG. 2 displays input color data that includes red, green, and blue color data each having a value of 40 and represents a white color, and the pixel SP2 of FIG. 2 displays input color data that includes red, green, and blue color data each having a value of 0 and represents a black color, the DET 151 may generate the first determination signal DS_1.

The adjustment unit 155 receives the input color data INPUT COLOR and the first determination signal DS_1 and generates the output color data OUTPUT COLOR. When a pixel adjacent to a pixel that displays a white color displays a black color, the adjustment unit 155 may decrease the value of green output color data of the pixel displaying a white color, based on the first determination signal DS_1. According to another embodiment, when a pixel adjacent to a pixel that displays a white color displays a black color, the adjustment unit 155 may increase the values of red and blue output color data of the pixel displaying a white color, based on the first determination signal DS_1.

The adjustment unit 155 may perform an arithmetic operation on the input color data INPUT COLOR and may generate the output color data OUTPUT COLOR. A method in which the adjustment unit 155 performs an arithmetic operation on the input color data INPUT COLOR and generates the output color data OUTPUT COLOR may vary according to various embodiments. For example, in FIG. 2, when a red or blue color is displayed via rendering of a right pixel, if a pixel adjacent to a pixel that displays a white color does not display a black color, the adjustment unit 155 may obtain the average of blue input color data for the pixel SP1 and blue input color data for the pixel SP2 and may determine the average to be blue output color data for the pixel PP2.

For example, when the values of the red, green, and blue color data for the pixel SP1 are 80, 60, and 40, respectively, and the values of red, green, and blue color data for the pixel SP2 are 20, 10, and 30, respectively, the adjustment unit 155 may determine the value of the blue color data for the pixel PP2 to be 35, i.e., an average of the value 40 of the blue color data for the pixel SP1 and the value 30 of the blue color data for the pixel SP2. In this case, the adjustment unit 155 may determine the value of green color data for the pixel PP1 to be 60, which is the value of the green color data for the pixel SP1. The adjustment unit 155 may also determine the value of green color data for the pixel PP2 to be 10, which is the value of the green color data for the pixel SP2.

For example, if a pixel adjacent to a pixel that displays a white color displays a black color, the adjustment unit 155 may increase the average of the blue input color data for the pixel SP1 and the blue input color data for the pixel SP2 by a predetermined value and may determine a result of the increase as the blue output color data for the pixel PP2. In other words, when a pixel adjacent to a pixel that displays a white color displays a black color, the adjustment unit 155 may increase, by a predetermined value, the blue output color data obtained when a pixel adjacent to a pixel that displays a white color does not display a black color, and may determine a result of the increase as the blue output color data.

For example, it is assumed that each of the pixels SP1 and SP3 of FIG. 2 displays input color data that includes red, green, and blue color data, each having a value of 40 and represents a white color, and each of the pixels SP2 and SP4 of FIG. 2 displays input color data that includes red, green, and blue color data, each having a value of 0 and represents a black color. In this case, the adjustment unit 155 may primarily calculate the values of output color data for the pixels PP1 through PP6 in the same method as a rendering method of other pixels, and may secondarily adjust the values of the output color data. For example, if the value of blue color data for the pixel PP4 has been primarily calculated as 30 in the same method as the rendering method of other pixels, the adjustment unit 155 may secondarily increase the value of 30 by a predetermined value, e.g., by 5, and determine a result of the increase, e.g., a value of 35, as the value of the blue color data for the pixel PP4. In addition, when a pixel adjacent to a pixel that displays a white color displays a black color, the adjustment unit 155 may increase, by a predetermined value, red output color data obtained when a pixel adjacent to a pixel that displays a white color does not display a black color, and may determine a result of the increase as the red output color data.

Similarly to the above-described determination of the blue color data for the pixel PP4, when the value of red color data for the pixel PP1 has been primarily calculated as 20 in the same method as the rendering method of other pixels, the adjustment unit 155 may increase 20 by a predetermined value, e.g., by 5, and may determine a result of the increase, e.g., a value of 25, as the value of the red output color data for the pixel PP1.

Similarly, when a pixel adjacent to a pixel that displays a white color displays a black color, the adjustment unit 155 may decrease, by a predetermined value, green output color data obtained when a pixel adjacent to a pixel that displays a white color does not display a black color, and may determine a result of the decrease as the green output color data.

Similarly to the above-described determination of the blue color data for the pixel PP4, when the value of green color data for the pixel PP1 has been primarily calculated as 40 in the same method as the rendering method of other pixels, the adjustment unit 155 may decrease 40 by a predetermined value, e.g., by 5, and determine a result of the decrease, e.g., a value of 35, as the value of the green color data for the pixel PP1.

Figure 4:
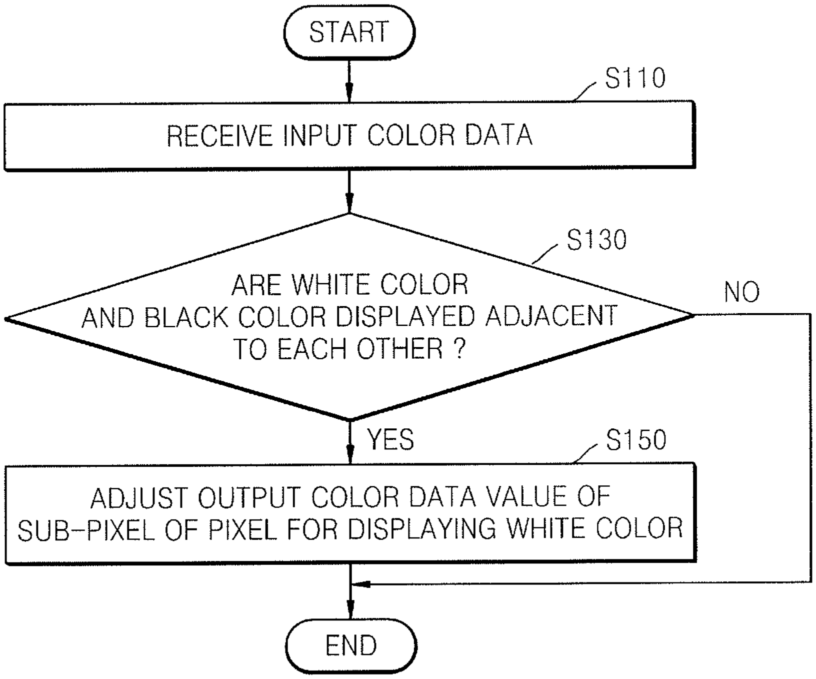
FIG. 4 is a flow chart of an operation of the color data converter included in the display device of FIG. 3.

FIG. 4 is a flow chart of an operation of the color data converter 150, according to an embodiment.

Referring to FIG. 4, in operation S110, the color data converter 150 receives input color data. In operation S130, the color data converter 150 analyzes the input color data to determine whether a pixel for displaying a white color is adjacent to a pixel for displaying a black color. In detail, the color data converter 150 may primarily determine whether the input color data is an input for a white color, and may secondarily determine whether a pixel adjacent to a pixel for displaying a white color displays a black color, if it is determined that the input color data is an input for a white color. The color data converter 150 may include the DET 151 of FIG. 3, and the DET 151 may analyze the input color data to determine whether a pixel adjacent to a pixel for displaying a white color displays a black color, and may generate the first determination signal DS_1 of FIG. 3.

In operation S150, if the pixel for displaying a white color is adjacent to the pixel for displaying a black color, the color data converter 150 adjusts the output color data value of a sub-pixel of the pixel for displaying a white color. The color data converter 150 may include the adjustment unit 155 of FIG. 3, and the adjustment unit 155 may adjust the output color data value based on the first determination signal DS_1 of FIG. 3.

If it is determined that a second pixel adjacent to a first pixel for displaying a white color displays a black color, the color data converter 150 may reduce a green color data value of the first pixel for displaying a white color. In this case, the decreased green color data value of the first pixel may be compensated for by increasing a green color data value of a third pixel adjacent to the first pixel for displaying a white color.

According to another embodiment, if it is determined that a pixel adjacent to a pixel for displaying a white color displays a black color, the color data converter 150 may increase red and blue color data values of the pixel for displaying a white color.

Accordingly, when a pixel adjacent to a pixel for displaying a white color displays a black color, the display device 100 according to an embodiment may decrease the value of green color data of the pixel for displaying a white color or increase the value of red color data or blue color data of the pixel for displaying a white color, by a predetermined value, thereby preventing a green tint phenomenon.

Figure 5:
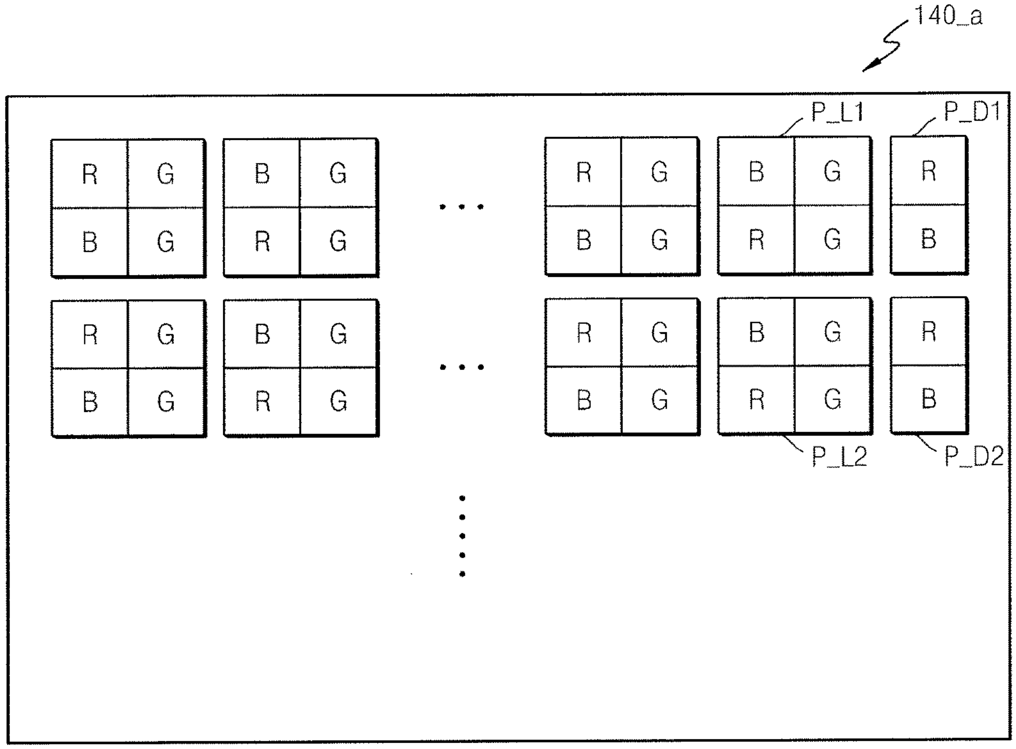
FIG. 5 is a block diagram of a display panel according to another embodiment.

FIG. 5 is a block diagram of a display panel 140_*a* according to another embodiment. Referring to FIG. 5, the display panel 140_*a* may include dummy sub-pixel columns P_D1 and P_D2.

In each of the dummy sub-pixel columns P_D1 and P_D2, a red sub-pixel and a blue sub-pixel may be alternately arranged at left and right corners of the display panel 140_*a*. The dummy sub-pixel columns P_D1 and P_D2 have no corresponding input color data, but may assist their adjacent pixels via rendering during display of a white color. In other words, when respective input color data values for a pixel P_L1 and a pixel P_L2 represent white, red color data and blue color data may be displayed on each of the dummy sub-pixel columns P_D1 and P_D2.

Figure 6:
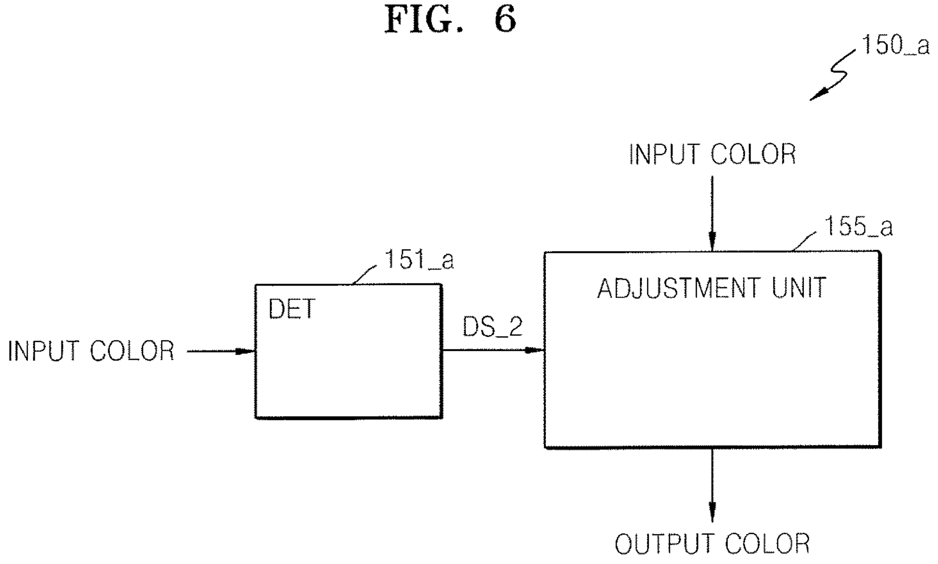
FIG. 6 is a block diagram of a color data converter according to another embodiment.

FIG. 6 is a block diagram of a color data converter 150_*a* according to another embodiment. Referring to FIG. 6, the color data converter 150_*a* includes a DET 151_*a* and an adjustment unit 155_*a*.

The DET 151_*a* receives input color data INPUT COLOR and generates a second determination signal DS_2. The DET 151_*a* determines whether a pixel corresponding to a corner of a display panel displays a white color, by analyzing the input color data INPUT COLOR. The DET 151_*a* generates the second determination signal DS_2, based on a result of the determination.

For example, when the input color data INPUT COLOR is input color data that has red, green, and blue color data values for the pixel P_L1 of FIG. 5, each of which is 40, and represents a white color, the DET 151_*a* may generate the second determination signal DS_2.

The adjustment unit 155_*a* receives the input color data INPUT COLOR and the second determination signal DS_2 and generates output color data OUTPUT COLOR. When the pixel corresponding to a corner of a display panel displays a white color, the adjustment unit 155_*a* may generate respective output color data values for the dummy sub-pixels P_D1 and P_D2 of FIG. 5. The adjustment unit 155_a may generate the respective output color data values for the dummy sub-pixels P_D1 and P_D2 of FIG. 5 by referring to respective input color data values for the pixels P_L1 and P_L2.

Figure 7:
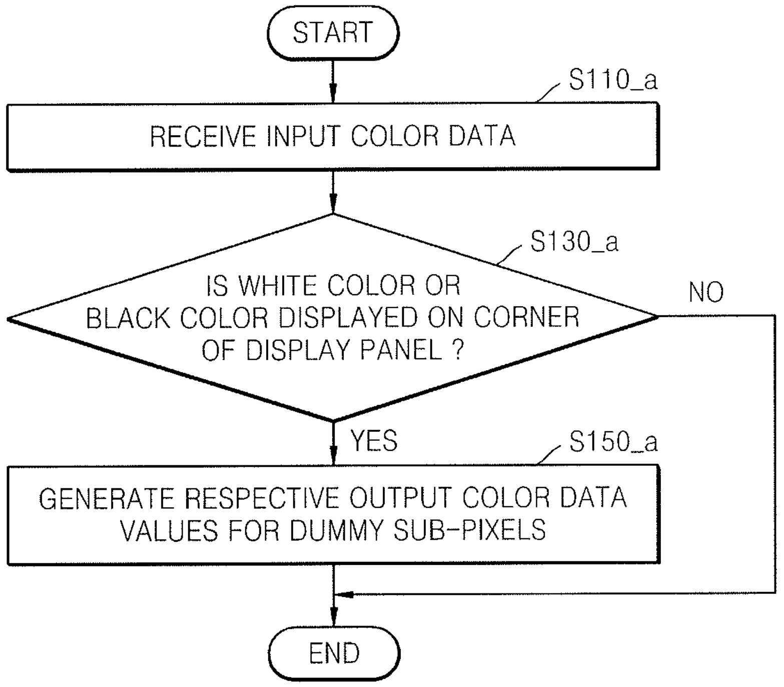
FIG. 7 is a flow chart of an operation of the color data converter of FIG. 6, according to an embodiment.

FIG. 7 is a flow chart of an operation of the color data converter 150_a, according to an embodiment.

Referring to FIG. 7, in operation S110_a, the color data converter 150_a receives input color data. In operation S130_a, the color data converter 150_a analyzes the input color data to determine whether a pixel for displaying a white color is located at a corner of a display panel. When the pixel corresponding to a corner of a display panel displays a white color, the adjustment unit 150_a may generate respective output color data values for the dummy sub-pixels P_D1 and P_D2 of FIG. 5, in operation S150_a. Therefore, when the pixel corresponding to a corner of a display panel displays a white color, the display device 100 displays blue and red colors through the dummy sub-pixels P_D1 and P_D2 of FIG. 5, thereby preventing a green tint phenomenon.

As described above, display devices according to example embodiments prevent a green tint phenomenon from occurring in display panels with a Pentile pattern arrangement, thereby enhancing the quality of an image. In contrast, when an image is displayed on a conventional display panel including pixels arranged in a Pentile pattern, the color data of the displayed image may be degraded due to pixel rendering in a part of the display panel where a black color and a white color are adjacent to each other. In this case, a green tint phenomenon (or a Greenish phenomenon) occurs, i.e., a green color is strongly expressed on a white part of an image due to a difference in luminance between red and blue pixels.

While the example embodiments has been particularly shown and described with reference to exemplary embodiments thereof, it will be understood by those of ordinary skill in the art that various changes in form and details may be made therein without departing from the spirit and scope of the example embodiments as defined by the following claims.

What is claimed is:

1. A display device, comprising:

a display panel including a plurality of virtual pixels each having only two sub-pixels, the plurality of virtual pixels having at least a first virtual pixel and a second virtual pixel adjacent to the first virtual pixel, and the first and second virtual pixels to display colors corresponding to first and second output color data, respectively; and a color data converter to convert first and second input color data into the first and second output color data, the color data converter including:

a determiner to receive the first and second input color data, to determine whether the first input color data is a white color data and the second input color data is a black color data, and to generate a first determination signal indicating that the first input color data is the white color data and the second input color data is the black color data based on the determination, and an adjuster to adjust the first output color data for the first virtual pixel or the second output color data for the second virtual pixel based on the first determination signal.

2. The display device of claim 1, wherein the adjuster is to decrease a value of a green color data of the first output color data for a green sub-pixel included in the first virtual pixel based on the first determination signal.

3. The display device of claim 2, wherein the adjuster is to increase a value of a green color data of a third output color data for a green sub-pixel included in a third virtual pixel adjacent to the first virtual pixel based on the first determination signal.

4. The display device of claim 1, wherein the adjuster is to increase a value of a red or blue color data of the first output color data for a red or blue sub-pixel included in the first virtual pixel.

5. The display device of claim 1, further comprising a dummy sub-pixel column including red sub-pixels and blue sub-pixels alternately arranged at either of right or left sides of the display panel.

6. The display device of claim 5, wherein the color data converter is to convert third input color data into third output color data for a third virtual pixel adjacent to a first dummy sub-pixel included in the dummy sub-pixel column, the determiner to receive the third input color data, to determine whether the third input color data is a white color data, and to generate a second determination signal indicating that the third input color data is the white color data based on the determination, the adjuster to adjust an output color data for the first dummy sub-pixel based on the second determination signal.

7. The display device of claim 6, wherein the adjuster is to increase a value of the output color data for the first dummy sub-pixel.

8. The display device of claim 1, wherein the display panel includes:

a first sub-pixel column having first and second sub-pixels for displaying respective first and second colors, the first and second sub-pixels being alternately arranged in a column direction;

a second sub-pixel column having the first and second sub-pixels alternatively arranged in an opposite order with respect to the alternating order of the first sub-pixel column in the column direction; and a third sub-pixel column having third sub-pixels for displaying a third color, the third sub-pixels being arranged in the column direction.

9. The display device of claim 8, wherein the plurality of virtual pixels are arranged in a pentile pattern.

10. The display device of claim 8, further comprising a plurality of pentile pixels each having the first virtual pixel and the second virtual pixel.

11. The display device of claim 8, wherein the plurality of virtual pixels includes a plurality of first virtual pixels and a plurality of second virtual pixels alternately arranged in a row direction and in a column direction.

12. The display device of claim 8, wherein the first virtual pixel includes one of the first sub-pixels and one of the third sub-pixels, and the second virtual pixel includes one of the second sub-pixels and one of the third sub-pixels.

13. A display device, comprising:

a display panel including a plurality of virtual pixels each having only two sub-pixels, the plurality of virtual pixels having at least a first virtual pixel and a second virtual pixel adjacent to the first virtual pixel, and the first and second virtual pixels to display colors corresponding to first and second output color data, respectively;

a data driver to supply the first and second output color data to the first and second virtual pixels, respectively;

a gate driver to supply a gate on voltage to the first and second virtual pixels; and a timing controller to control driving of the data driver and the gate driver, the timing controller including:

a determiner to receive first and second input color data to be converted into the first and second output color data, respectively, to determine whether the first input color data is a white color data and the second input color data is a black color data, and to generate a first determination signal indicating that the first input color data is a white color data and the second input color data is a black color data based on the determination, and an adjuster to adjust the first output color data for the first virtual pixel or the second output color data for the second virtual pixel based on the first determination signal.

14. The display device of claim 13, wherein the adjuster is to decrease a value of a green color data of the first output color data for a green sub-pixel included in the first virtual pixel based on the first determination signal.

15. The display device of claim 14, wherein the adjuster is to increase a value of a green color data of a third output color data for a green sub-pixel included in a third virtual pixel adjacent to the first virtual pixel based on the first determination signal, the first virtual pixel being between the second and third virtual pixels.

16. The display device of claim 13, wherein the adjuster is to increase a value of a red or blue color data of the first output color data for a red or blue sub-pixel included in the first virtual pixel based on the first determination signal.

17. A method of driving a display device, the display device including a display panel including a plurality of virtual pixels each having only two sub-pixels, the plurality of virtual pixels having at least a first virtual pixel and a second virtual pixel adjacent to the first virtual pixel, and the first and second virtual pixels to display colors corresponding to first and second output color data, respectively, the method comprising:

receiving first and second input color data to be converted into the first and second output color data, respectively, by a determiner;

determining whether the first input color data is a white color data and the second input color data is a black color data, by the determiner;

generating a first determination signal indicating that the first input color data is a white color data and the second input color data is a black color data based on the determination, by the determiner; and adjusting the first output color data for the first virtual pixel or the second output color data for the second virtual pixel based on the first determination signal, by an adjuster.

18. The method of claim 17, wherein adjusting the first or second output color data includes decreasing a value of a green color data of the first output color data for a green sub-pixel included in the first virtual pixel based on the first determination signal.

19. The method of claim 18, wherein adjusting the first or second pentile color data includes increasing a value of a green color data of a third output color data for a green sub-pixel included in a third virtual pixel adjacent to the first virtual pixel based on the first determination signal, the first virtual pixel being between the second and third virtual pixels.

20. The method of claim 18, wherein adjusting the first or second pentile color data includes increasing a value of a red or blue color data of the first output color data for a red or blur sub-pixel included in the first virtual pixel.

* * * * *